Patented Dec. 11, 1928.

1,695,251

UNITED STATES PATENT OFFICE.

VLADIMIR ANATOLE KALICHEVSKY, OF WILLOWBROOK, CALIFORNIA, ASSIGNOR TO UNION OIL COMPANY OF CALIFORNIA, OF LOS ANGELES, CALIFORNIA, A CORPORATION OF CALIFORNIA.

PROCESS FOR DECOLORIZING KEROSENE, GASOLINE, AND SIMILAR LIGHT PETROLEUM DISTILLATES.

No Drawing. Application filed September 19, 1927. Serial No. 220,637.

This invention relates to the decolorization of petroleum products, especially the lighter distillates thereof, of which kerosene, gasoline and cracked gasoline are examples indicating the range of the present process.

One object of the invention is to provide an improved process which is generally more efficient for the decolorization of such distillates as those indicated, particularly those from certain stocks. A more specific object is to obtain products of the stated character which shall have a color at least equal to that heretofore obtained by air agitation, it being desired to accomplish such result without employing air agitation, in order to avoid various disadvantages of agitation with air such as losses in vapor and undesirable oxidation as more fully set forth later.

In so treating such products according to one known scheme of operation, it is desirable frequently to employ an acid and clay treatment in which agitation is required, the clay being added to an acid stock following an acid treatment, or the clay being mixed with the stock along with the acid. For this purpose air agitation has been found satisfactory in many cases and in other instances it has been found preferable to mechanical agitation in view of the fact that it has given a better color in the product. But the color so obtained has not always been satisfactorily stable, and this is particularly true of certain stocks wherein the air apparently converts certain constituents into stable forms which subsequently cause the products to take on undesirable colors. When using mechanical agitation, more clay, acid and time are required to obtain colors comparable to those obtained with air agitation, and with some stocks comparable colors cannot be obtained at all with such a process employing mechanical agitation. Apparently there are some coloring matters that are not readily adsorbable, which matters, however, apparently are converted into adsorbable forms by air agitation. But, in addition to vapor losses, air agitation presents the further objection that such a process cannot always be carried on continuously without impairing the quality of the final product.

Attempts merely to substitute mechanical agitation for air agitation resulted in inferior colors in the product, and when the distillate was treated under the same conditions with acid and clay or with clay alone air agitation gave much superior results than did agitation by mechanical means.

I have made the unexpected discovery that, if the mentioned distillates, particularly when obtained from refractory stocks, are treated with a caustic alkali before being subjected to the clay treatment, mechanical agitation may be employed to yield a product having a color at least equal to that produced by air agitation, and that the color so obtained usually is much more stable than that produced by air agitation. While I do not limit myself to the theory, I believe that both the air treatment and the alkali treatment are capable of placing the difficultly adsorbable coloring matters in a more easily adsorbable form. However, it is equally probable that certain inhibiting bodies are removed by the alkali treatment. It is necessary to use the alkali in sufficient quantities to act upon the distillate to convert the matters which cause the undesirable color into such forms that they will be adsorbed when subsequently treated with clay. In any event, I have found the above treatment useful for the distillates mentioned, the preliminary caustic wash and subsequent mechanical agitation resulting in a color equal or superior to that obtained by air agitation. With gasoline which tends to become pink in connection with acid-clay treatment, this treatment has been beneficial in that it has prevented such color development.

Briefly stated, the invention in a broad aspect comprises the employment of a preliminary caustic wash for a light petroleum distillate, this wash being followed by an acid and clay treatment or by treatment with clay alone, the caustic being employed in such amounts as will convert coloring matters into forms adsorbed by the clay. In a preferred embodiment, the clay or the acid and clay are commingled with the distillate by mechanical means. The final color of the resulting product is equal to that otherwise obtained by air agitation and is stable. This process may be carried on continuously without impairing the final product and the invention, therefore, resides further in a continuous treatment of a distillate as above specified with a preliminary caustic wash and with clay or acid and clay under mechanical agitation. The acid and clay may be added to the oil either separately or together following the caustic wash, the process being completed with removal of the clay from the distillate and yielding a neutralized product of desirable color characteristics. If the oil is treated with acid before the addition of clay, the sludge may or may not be removed as desired, and if the sludge is withdrawn a small quantity of additional acid may or may not be added to the distillate.

Considered in detail, the invention consists in treating the light petroleum distillate, which term includes kerosene, straight-run gasoline and cracked gasoline, with a solution containing about 10% of sodium hydroxide by weight. The amount of the caustic solution and its strength will vary according to conditions and according to the stock, but in any event will be sufficient to neutralize any mineral acidity, to remove the organic acids present and to convert into adsorbable forms the coloring matters which would otherwise impart an undesirable color to the product. The alkali is properly commingled with the oil in order to produce a satisfactory washing of the oil therewith.

The solution is then allowed to settle and is removed, following which a water wash may or may not be given as may be advantageous or desirable.

The next step, according to one form, consists in subjecting the oil to the action of an acid, preferably sulfuric acid, following which the acid sludge may or may not be withdrawn according to preference or to the stock being treated. The amount of acid employed will vary with the stock as is well understood in the art, and may be anywhere between 0.02% and 5% by weight based upon the material being treated.

Following the acid treatment, a decolorizing clay of suitable character as is well understood is added to the oil in such quantities as seems desirable, this amount varying usually between 0.02% and 5% or thereabouts according to conditions. If the acid sludge has been withdrawn previous to the introduction of clay, a small amount of acid may be added with the clay if desired, but this usually is not necessary. The mixture is then agitated to produce thorough contact between the distillate and the clay, and in the preferred form this agitation is produced by mechanical means such as a paddle agitator. Following proper agitation the clay is separated from the distillate, thereby yielding the final product which is neutral and whose color will be found satisfactory and stable.

According to a modification, the caustic wash, with or without the ensuing water wash, is followed by the introduction of both clay and acid to the oil, the acid and clay being thoroughly mixed by mechanical means and the clay then being removed as in the form just described.

In either instance, a product of good color is obtained, this color being equal to that of air agitation and having the advantage that it is more stable. With either form, the operation may be carried on continuously, the materials being continuously introduced and being continuously withdrawn, the product having the same good, stable color.

A further modification consists in first treating the stock with acid, withdrawing the acid sludge, following the sludge removal with the caustic wash, removing the caustic solution, washing the oil with water or not as desired, then reacidifying the oil and adding the clay, and agitating to produce good contact. In this modification also, the second acid treatment may take place before the clay is added; or, after introducing both the clay and acid, treatment with said clay and acid may be carried on simultaneously, and the mechanical agitation employed in conjunction therewith. With this modification, a smaller quantity of acid may be employed following the caustic wash than is employed prior to said wash, and this amount may also be smaller than that employed in the forms first described.

The caustic material employed ordinarily will be sodium hydroxide because of its convenience and low cost but other caustic materials such as potassium, calcium and other hydroxides may also be employed. Instead of sulphuric acid any other acid suitable for the purpose such as hydrochloric acid might be used. Similarly, raw clays, treated clays, or acidified clays of various types and forms known to the industry, may be satisfactorily used where a clay is specified. Moreover, the caustic wash may be applied before or after the main acid treatment if such is required, but if the caustic wash is made after the main acid treatment the stock should preferably be reacidified before the clay is added.

As an example of results which may be obtained according to this invention, in connection with the treatment of a sample of kerosene distilled from California crude oil air agitation thereof when treated with 2% of sulfuric acid with withdrawal of most of the sludge and addition of 1% of clay with air agitation for a total of 25 minutes gave a color on the standard Saybolt colorimeter scale of 27—28, while mechanical agitation using the same amounts on the same material gave a color of only 22—23. But when the same kerosene was first washed for 10 minutes with 5% of caustic solution containing 10% NaOH and then subjected to the acid and clay treatment in a mechanical mixer for a total of 25 minutes, the final color obtained was 27—28 Saybolt.

It is to be understood that the invention is not limited to the specific modifications above disclosed, since these are merely illustrative of the invention in its generic form and many variations may be made within the scope of the following claims.

I claim:

1. A process for the purification of petroleum distillates containing difficulty adsorbable coloring matters, comprising subjecting the stock to a caustic wash sufficient to convert coloring matters into adsorbable forms, then subjecting the distillate to the action of acid and clay to adsorb the converted constituents, and removing the clay from the distillate to yield a final product.

2. A process according to claim 1, wherein the distillate, acid and clay are thoroughly commingled by mechanical means.

3. The process for decolorizing lighter petroleum distillates such as kerosene and gasoline, comprising subjecting the same to a caustic wash the amount of caustic being sufficient to convert coloring matter in said distillates so that on subsequent mechanical agitation it will give desired color, rendering the resulting distillate acid, treating the acid distillate with clay under thorough agitation with mechanical means, and separating the clay from the distillate to yield a final neutral product of stable color.

4. The process according to claim 3 wherein the steps are carried on continuously.

5. A process for decolorizing petroleum distillates which comprises preliminarily subjecting the distillate to the action of an alkali sufficient to convert coloring matter into adsorbable form under such conditions that, upon clay treatment, the clay will adsorb coloring matters to produce the required color, and then treating the distillate with such clay under agitation.

6. A process for decolorizing lighter petroleum distillates such as kerosene, gasoline, comprising subjecting the same to the action of a caustic alkali and then to the action of clay, the alkali being used in amounts sufficient to convert into readily adsorbable forms the coloring matters not otherwise easily adsorbable by the clay.

7. A process for decolorizing lighter petroleum distillates containing coloring matters not readily adsorbable by clay, comprising treating the distillates with alkali sufficient to convert said matters into adsorbable forms and then commingling the distillate with acid and clay for adsorption of said adsorbable forms.

8. The process for decolorizing petroleum distillate with clay to produce a color equal to that produced by air agitation, comprising treating the oil with caustic in amounts sufficient to convert coloring matters into forms adsorbable by clay, then commingling the distillate with clay and removing the clay to yield the final product.

9. A process according to claim 8 wherein the clay and distillate are commingled under the influence of mechanical agitation other than air agitation.

10. A process for decolorizing cracked gasoline comprising subjecting the same to the action of a caustic alkali sufficient to convert coloring matters into adsorbable forms, then subjecting the gasoline to the action of acid and clay, commingling the clay and acid with the gasoline by mechanical means, and separating the clay from the gasoline to yield a final gasoline product.

11. A process for decolorizing the lighter petroleum distillates at least as light as kerosene, comprising subjecting the same to the action of acid, cautic and clay, the caustic treatment preceding the clay treatment and employing caustic in amounts sufficient to convert the coloring matters into forms adsorbable by the clay, thoroughly commingling the clay with the distillate, and then separating the clay from the distillate to yield a final product.

12. A process according to claim 11, wherein the commingling of the clay with the distillate is accomplished by mechanical means, and the final color of the distillate is at least equal to that obtainable with air agitation.

13. A method for decolorizing petroleum distillates which are not sufficiently decolorizable by treatment with clay and mechanical agitation to produce color equal to that producible by clay and air agitation which comprises initially heating said distillates with alkali and subjecting said distillates to said clay treatment with mechanical agitation under equivalent conditions.

Signed at Wilmington, in the county of Los Angeles, and State of California, this 9th day of September, A. D. 1927.

VLADIMIR ANATOLE KALICHEVSKY.